United States Patent [19]

Wolf

[11] 4,336,009
[45] Jun. 22, 1982

[54] MOLDING TOOL

[75] Inventor: Franz-Josef Wolf, Bad Soden Salmunster, Fed. Rep. of Germany

[73] Assignee: WOCO Franz-Josef Wolf & Co., Bad Soden Salmunster, Fed. Rep. of Germany

[21] Appl. No.: 207,933

[22] Filed: Nov. 18, 1980

[30] Foreign Application Priority Data

Nov. 26, 1979 [DE] Fed. Rep. of Germany ....... 2947621

[51] Int. Cl.³ .......................... B29C 1/00; B29C 6/02
[52] U.S. Cl. .................................. 425/116; 249/83; 425/806; 264/276
[58] Field of Search ................ 264/276; 425/806, 110, 425/116; 249/83

[56] References Cited

U.S. PATENT DOCUMENTS

| 2,669,753 | 2/1954 | Horman | 264/276 |
| 2,724,864 | 11/1955 | Krotz | 264/276 |
| 2,937,409 | 5/1960 | Cole | 264/276 |
| 3,238,287 | 3/1966 | Chapman | 264/276 |
| 3,354,529 | 11/1967 | James | 264/276 |
| 3,408,438 | 10/1968 | Staunton | 264/276 |
| 3,539,675 | 11/1970 | Hugill | 264/276 |
| 4,029,388 | 6/1977 | Knoll | 264/276 |

Primary Examiner—James B. Lowe
Attorney, Agent, or Firm—Finnegan, Henderson, Farabow, Garrett and Dunner

[57] ABSTRACT

A molding tool including an edge-sealing profile designed to bind the surface section of a molded article which is not to be coated, and which is integral with the surface of the molding tool that is under compression when the tool is closed.

3 Claims, 1 Drawing Figure

MOLDING TOOL

BACKGROUND OF THE INVENTION

I. Field of the Invention

The present invention relates to a molding tool for injection/extrusion coating of defined regions.

II. Description of the Prior Art

It is commonplace in the state-of-the-art of extrusion-coat molded articles made of dimensionally stable materials, for instance metals or plastics, on predetermined surface segments, with molding substances. To that end the molded articles are placed in part of an opened molding tool, which then is closed, whereupon the molding substance is injected into the correspondingly formed mold cavity. The molding tool under its closing pressure lies flat against those surface sections of the molded article which must not be covered with the injected substances and in such a manner as to also hug their profiles.

Molding substances in the sense of the invention are especially non-crosslinked rubber materials which will be crosslinked after injection into the cavity of the mold, and thermoplastic and thermosetting plastics. The molded articles to be coated for instance are disks, plates, shaped sections, rings or grids. The concept of "coating" within the scope of this invention refers both to injection molding and to compression molding and related methods.

Such methods are employed, for instance, for coating sealing elements to molded articles of all kinds, in particular sealing means.

When the process is carried out, the molded article to be thus coated is first placed in the molding tool and when closing the molding tool, the molding substance is forced in at very high pressure and in the plastic-flowable state. Inevitably as regards the known molding tools and methods, the molding substance at least in the rim areas will penetrate the separation plane between the molding tool and the molded article. This leads to forming frayed edges and skins on the surface sections of the molded article, which in the sense of the invention should not be covered by the molding substance. Practically, this penetration of the highly pressurized molding substance injected from the mold cavity into the separation plane cannot be eliminated because the parts to be coated as a rule are stamped, injection or compression-molded, with surfaces never corresponding perfectly with the ideal one. This problem is aggravated further in the case of molding substances being non-crosslinked rubber mixtures, which are known to tend strongly to penetrate such separation plane gaps. When injected at high pressures into a mold cavity, rubber mixtures may even enter the separation plane gap between two butting surfaces when these are precision-polished.

For these reasons, the injection-extrusion coating of dimensionally stable molded articles when employing plastic molding substances has been found practical only in the manufacture of rather coarse parts for which the formation of skins by the coating substance does not degrade the product quality. To date, precision parts with an absolutely sharp boundary between the coated material and the surface of the molded article which must remain free could not be manufactured to meet the requirements of industrial mass-production.

It is the object of the invention to create a molding tool by means of which dimensionally stable molded articles can be injection-extrusion coated with a molding substance which is plastic during the coating, in a manner meeting the requirements of series and mass production, and such that the surfaces on the molded articles which must remain clear will evince sharp and neatly bounded limit lines or limit edges, as demanded by precision parts.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To solve the problems of the prior art, the invention proposes a molding tool of the initially cited kind evincing the features stated in the appended claims.

It is the basic concept of the invention to pass from the previous areal sealing between the molded article and the molding tool to an edge sealing which encloses hermetically the surface section of the molded article which must remain clear. This design of the molding tool is based on the consideration that the sealing edge impression on molded articles, which can never be wholly avoided, will be located so closely to and directly in the boundary transition between the coated material and the molded-article surface which must remain clear, that said surface in no way will be degraded by said impression and in practically every case cannot even be noticed without removing the coated material from the molded-article surface.

Preferably the edge sealing profile opposite the directly adjoining surfaces of the molding tool is designed as a projecting cutting edge profile with an essentially triangular cross-section, preferably an isoceles triangular or a right-angle triangular cross-section, merely a fraction of a millimeter high. The right-angle triangular cutting-edge profile preferably is selected when the sealing cutting edge is located directly at an edge or recess of the molding tool. The one leg of the right angle of the triangular profile is then located precisely in the recess plane, which is located at a slope or perpendicular to the surface on the molded article which must not be coated.

A molding tool so designed achieves sharply bounded transitions between the coated material and the surface not to be coated on the molded article. Molded articles so coated also can be series and mass produced as precision parts. In particular sealing disks made of aluminum or plastic for cans and other shaped cases can be cleanly coated with a rubber seal by employing this process.

The invention is discussed in closer detail below in relation to an illustrative embodiment and the drawing.

BRIEF DESCRIPTION OF THE DRAWINGS

The accompanying drawing, which is incorporated in and constitutes a part of the specification, illustrates a preferred embodiment of the invention and, together with the general description of the invention given above and the detailed description of the preferred embodiment given below, serves to explain the principles of the invention.

DESCRIPTION OF THE PREFERRED EMBODIMENT

Figure 1:
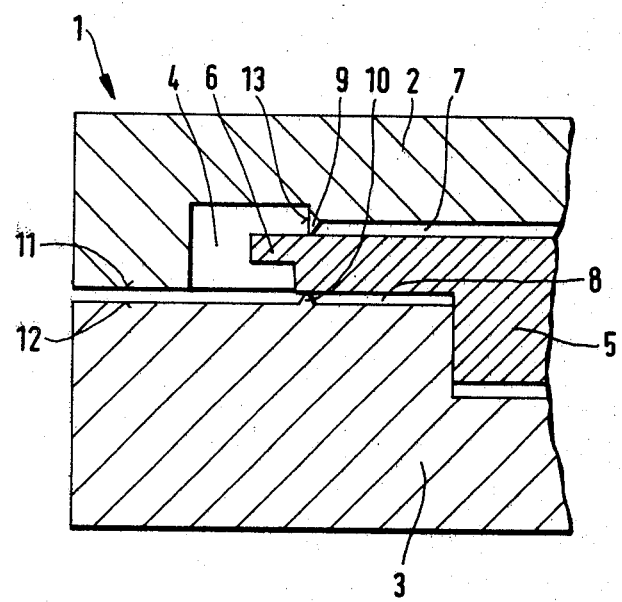
FIG. 1 is a schematic cross-section, not to scale, of a molding tool as yet not wholly closed, with a molded article within it.

Reference will now be made in detail to the present preferred embodiment of the invention as illustrated in the accompanying drawings.

FIG. 1 is a cross-section and a partial representation of a two-part molding tool 1 consisting of an upper part 2 and a lower part 3. The molded article 5 which is to be coated is placed in the mold cavity 4 of the molding tool 1. For the illustrative embodiment shown in FIG. 1, the molded article 5 is a circular aluminum profiled disk of which the outer rim 6 must be coated with a rubber seal. The rubber material will be injected into the mold cavity 4 after the molding tool 1 has been finally closed.

To prevent the rubber molding substance injected into the mold cavity 4 from penetrating the separation plane gap 7 between the lower side of the upper tool 2 and the upper side of the molded article 5, and the separation plane gap 8 between the upper side of the lower tool 3 and the underside of the molded article 5, edge-sealing profiles, here cutting edge profiles 9 and 10, circular and closed on themselves, integral with the upper tool 2 and the lower tool 2 respectively, are provided at the outer rims of the surfaces on the molded article 5 which must be kept free from the rubber material. For the sake of clarity, these cutting-edge sealing profiles 9, 10 are shown exaggeratedly in FIG. 1. The tool 1 is shown in the phase directly before final closure.

The moment the final closure force presses the two tool parts 2, 3 against each other, whereby these lie flush against one another by their surfaces 11, 12, the cutting edge profiles 9, 10 dent the surfaces of the molded article 5 and thereby seal the mold cavity 4 hermetically against the separation plane gaps 7, 8. The touching separation plane surfaces 11, 12 of the tool parts 2, 3 need not be sealed in this manner as the ordinary fine burrs formed in these locations as a rule can be easily tolerated or else can be practically removed in economic manner thereafter.

The cutting edge profile 9 essentially is the cross-section of a right-angle triangle, one leg of the right-angle being flush with the recess 13 in the upper tool part 2.

The cutting-edge profile 10 preferably assumes in its cross-section essentially the shape of an isosceles triangle.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or scope of applicant's general inventive concept.

I claim:

1. In a molding tool having oppositely facing first and second surfaces defining a mold cavity therebetween for the rubber injection coating of the outer rim of a circular disk, the improvement comprising: means for sharply defining a boundary transition between said coating on said outer rim of said disk and the remaining surfaces of said disk, said means including oppositely facing, triangular cross-sectioned projections extending merely a fraction of a millimeter from said first and second surfaces, and which projections engage said disk sufficiently close to said boundary transition during injection of said coating to result in no noticable impression in said disk except upon removal of said coating.

2. The molding tool of claim 1 wherein said projections have isosceles triangular cross-sections.

3. The molding tool of claim 1 wherein said projections have right-angle triangular cross-sections.

* * * * *